US006726512B2

(12) United States Patent

Saito

(10) Patent No.: US 6,726,512 B2
(45) Date of Patent: Apr. 27, 2004

(54) ENGINE CONTROL UNIT FOR MARINE PROPULSION

(75) Inventor: Chitoshi Saito, Shizuoka (JP)

(73) Assignee: Yamaha Marine Kabushiki Kaisha, Shizuoka (JP)

(*) Notice: Subject to any disclaimer, the term of this patent is extended or adjusted under 35 U.S.C. 154(b) by 0 days.

(21) Appl. No.: 10/277,464

(22) Filed: Oct. 21, 2002

(65) Prior Publication Data

US 2003/0040232 A1 Feb. 27, 2003

(30) Foreign Application Priority Data

Oct. 22, 2001 (JP) ....................................... 2001-323327

(51) Int. Cl.7 ................................................ B60K 41/00
(52) U.S. Cl. .......................... 440/87; 440/1; 123/339.23
(58) Field of Search ........................................ 440/1, 87

(56) References Cited

U.S. PATENT DOCUMENTS 5,365,908 A 11/1994 Takii et al.
5,713,339 A 2/1998 Kishida et al.
5,724,951 A 3/1998 Mukumoto
5,775,311 A 7/1998 Kato et al.
5,918,584 A 7/1999 Kato
5,941,223 A 8/1999 Kato
6,065,442 A 5/2000 Motose et al.
6,065,445 A 5/2000 Motose et al.
6,116,228 A 9/2000 Motose et al.
6,131,554 A 10/2000 Ito et al.
6,216,663 B1 4/2001 Kato et al.
6,302,086 B1 10/2001 Kato
6,325,046 B1 12/2001 Kanno
6,481,411 B1 * 11/2002 Katayama .............. 123/339.23
6,491,033 B1 * 12/2002 Motose et al. .............. 123/683

* cited by examiner

*Primary Examiner*—Jesus D. Sotelo
(74) *Attorney, Agent, or Firm*—Knobbe, Martens, Olson & Bear, LLP.

(57) ABSTRACT

A marine engine is controlled to operate in a lean burn mode during middle range operation. During low speed/low load operation, an engine is operated at a preset air/fuel ratio. The engine then transitions to a lean burn mode and operates in the lean burn mode during mid speed/mid load operation. The engine then receives a richer air/fuel ratio during high speed/high load operation.

20 Claims, 5 Drawing Sheets

ENGINE CONTROL UNIT FOR MARINE PROPULSION

PRIORITY INFORMATION

This application is based on and claims priority to Japanese Patent Application No. 2001-323327, filed Oct. 22, 2001, the entire contents of which is hereby expressly incorporated by reference.

BACKGROUND OF THE INVENTION

1. Field of the Invention

The present invention generally relates to a method of controlling engine operation and more specifically relates to such a method adapted for use with a marine engine designed for stoichiometric and lean burn operation.

2. Description of the Related Art

Internal combustion engines are used to power various types of vehicles. For instance, land vehicles, such as automobiles, are powered by internal combustion engines. Such engines can be designed to operate under various air-fuel ratios.

With reference to FIG. 1, operation of one such engine design used in land vehicle application is graphically depicted. In the illustrated arrangement, intake air pressure is shown as a function of throttle opening. The air-fuel ratio, in turn, is shown as a function of throttle opening as well.

As known, the engine operates at an idle speed when the throttle valve is totally or substantially closed. At idle speed, the intake air pressure at a location between the throttle valve and the combustion chamber is at a minimum. Thus, during idle, the engine is operating in a low speed and low load mode. This low speed and low load mode generally continues as the vehicle slowly accelerates and cruises at highway speed. Of course, short bursts of higher speed and higher load operation can be expected.

The low speed and low load operating range, nevertheless, is the normal operating range for an automobile. From time to time, the engine may be called upon to operate within a high load and high speed operating range, albeit fairly infrequently. With reference to FIG. 1, the illustrated arrangement provides that the engine transitions out of a lean burn mode after the intake air pressure has reached a maximum air pressure, which is associated with high load operation.

As illustrated, when operating the engine in other than the high load and high speed operating range, it is possible to operate the engine in a lean burn mode. The lean burn mode involves supplying a lower than stoichiometric air-fuel ratio, which supplies less fuel per combustion cycle. Such lean burn operation, therefore, can lower fuel consumption. When engine demand is great, however, the air-fuel ratio can be richened to provide for better response to operator demand.

Marine vehicles, on the other hand, generally operate in the high load and high speed operating range once the transmission engages a propulsion unit (e.g., propeller or jet pump). Thus, the engine spends a majority of its run time in a high load operating range. As such, the above-described lean burn transition would result in minimal fuel conservation.

One thought is to design the engine to operate in the lean burn mode. Such an engine design adds significantly to the cost and complexity of the engine design. For instance, devices such as a swirl control valve or a valve stop and design changes such as a helical port or a tumble port would have to be integrated into the construction of the engine for proper operation in lean burn mode at all times.

SUMMARY OF THE INVENTION

Thus, a marine engine that is capable of reducing fuel consumption by operating in a lean burn mode yet capable of improved stability during idling and trawling operation is desired.

Accordingly, one aspect of the present invention involves an outboard motor for a watercraft. The outboard motor comprises an engine body defining at least one cylinder bore in which a piston reciprocates. A cylinder head is affixed to one end of the engine body and closes the cylinder bore and defines with the piston and the cylinder bore a combustion chamber. An intake passage is in fluid communication with the combustion chamber and is configured to provide air for an air/fuel mixture to the combustion chamber. A throttle body is in fluid communication with the intake passage and has a throttle plate configured to control an airflow in the intake passageway. A throttle position sensor is configured to determine a position of the throttle plate. An intake air pressure sensor is in fluid communication with the intake passage. The air pressure sensor is positioned between the throttle valve and the combustion chamber and is configured to determine air pressure in the intake passage. A fuel injector is configured to deliver fuel to the combustion chamber for the air/fuel mixture. An engine speed detector is configured to determine an engine speed. An engine control unit is configured to control the fuel injector based upon feedback from at least one of the throttle position sensor, the engine speed detector, and the intake air pressure sensor. Between a closed state of the throttle plate and a first predetermined air pressure, a constant air/fuel ratio is maintained. From the first predetermined air pressure to a second predetermined air pressure, the air/fuel ratio is steadily increased as a function of a change in air pressure to approximately a lean limit ratio. The second predetermined air pressure is less than a maximum intake air pressure. The maximum intake air pressure occurs when the air pressure in the intake passage becomes approximately constant. From the second predetermined intake air pressure to the maximum intake air pressure, the air/fuel ratio is maintained at approximately the lean limit and from the maximum intake air pressure to a maximum throttle opening, the air/fuel ratio is decreased in accordance with feedback from the throttle position sensor and the engine speed detector.

Another aspect of the present invention involves a method of operating an outboard motor. The outboard motor comprises an engine driving a marine propulsion device at speeds indicated by an engine speed sensor. The method comprises detecting an induction system air pressure at a location between a throttle valve and a combustion chamber, supplying a preset constant air/fuel ratio to the combustion chamber at sensed air pressures lower than a first predetermined air pressure, supplying a variable air/fuel ratio at sensed air pressures between the first predetermined air pressure and a second predetermined air pressure, supplying a lean limit air/fuel ratio at sensed air pressures between the second predetermined air pressure and a maximum air pressure and supplying a variable air/fuel ratio at throttle angles greater than a minimum throttle angle corresponding to the maximum air pressure.

BRIEF DESCRIPTION OF THE DRAWINGS

These and other features, aspects and advantages of the present invention will now be described with reference to the drawings of a preferred embodiment, which embodiment is intended to illustrate and not to limit the invention. The drawings comprise five figures.

DETAILED DESCRIPTION OF THE PREFERRED EMBODIMENT

Figure 2:
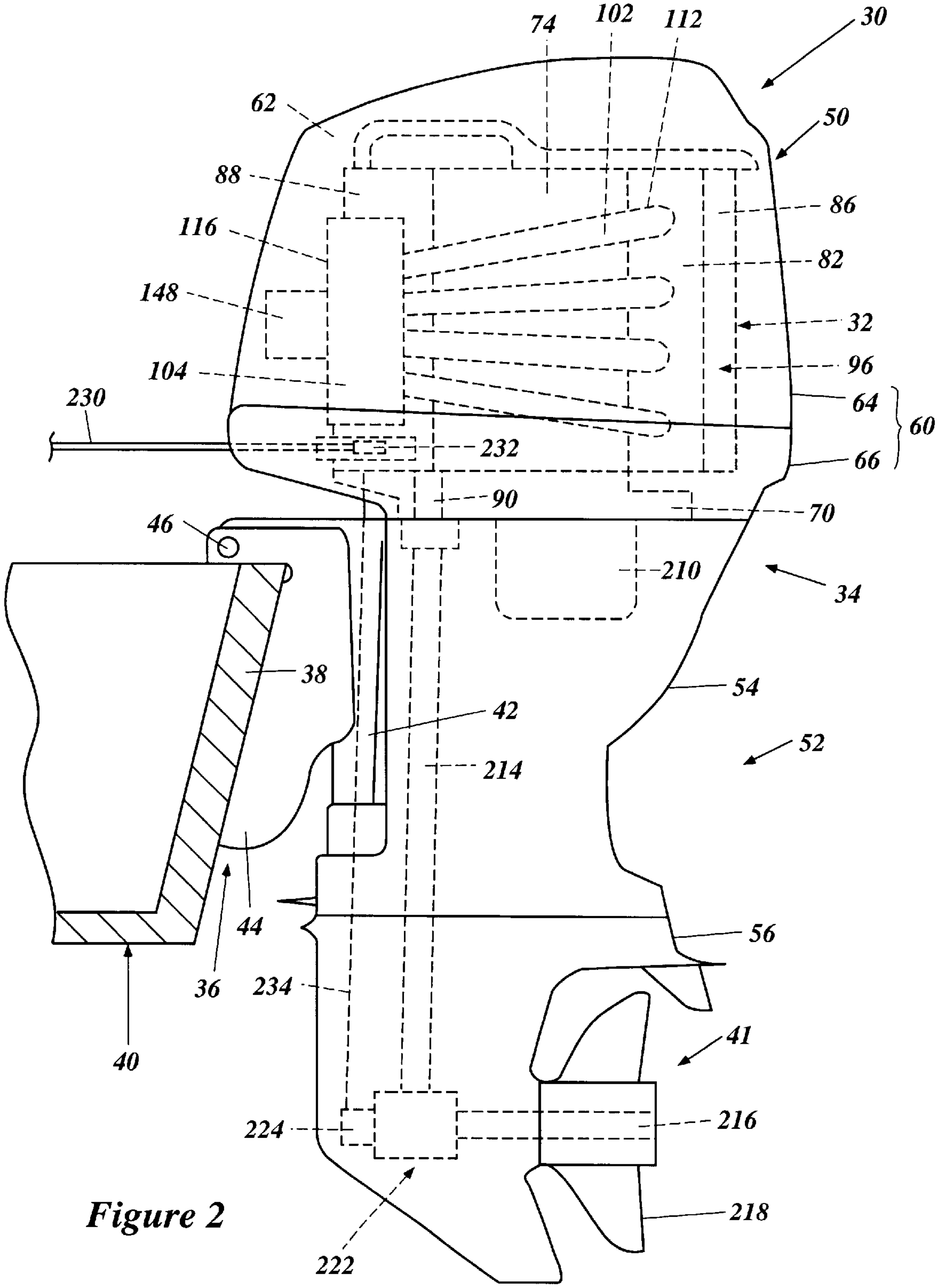
FIG. 2 is a side elevational view of an outboard motor that incorporates an engine which is controlled by a control system configured in accordance with a preferred embodiment of the present invention, wherein the outboard motor is mounted on a watercraft (shown in partial cross section).
Figure 3:
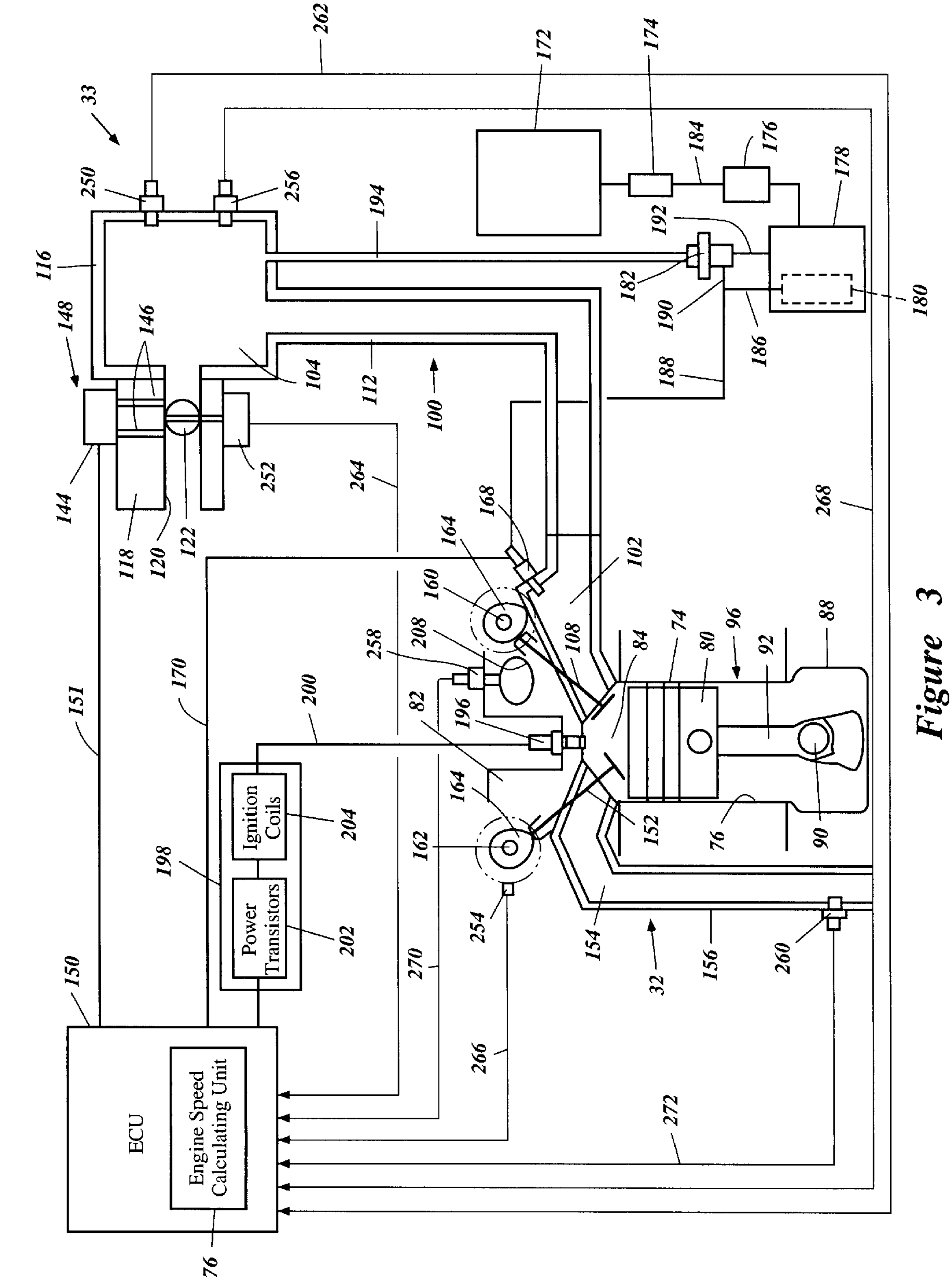
FIG. 3 is a schematic view of the control system.

FIGS. 2 and 3 illustrate an overall construction of an outboard motor 30 that incorporates an internal combustion engine 32. As will be understood, the term engine 32 refers to the power plant while the term outboard motor 30 refers to the overall construction, which includes the engine, a drive shaft and the associated housing components. The internal combustion engine 32 is controlled by a control system 33 (see FIG. 3) configured in accordance with certain features, aspects and advantages of the present invention. The engine 32 and the associated control system 33 have particular utility in the context of an outboard motor, and thus are described in the context of an outboard motor. The engine 32 and the associated control system 33, however, can be used with other types of marine drives (e.g., inboard motors, inboard/outboard motors, etc).

With reference initially to FIG. 2, the outboard motor 30 generally comprises a drive unit 34 and a bracket assembly 36. The bracket assembly 36 supports the drive unit 34 on a transom 38 of an associated watercraft 40 (shown in partial cross section). The drive unit 34 is positioned on the watercraft 40 such that a marine propulsion device 41, which is disposed at a lower portion of the drive unit 34, is submerged when the watercraft 40 is floating on a body of water. The bracket assembly 36 preferably comprises a swivel bracket 42, a clamping bracket 44, a steering shaft and a pivot pin 46.

The steering shaft typically extends through the swivel bracket 42 and is affixed to the drive unit 34 by top and bottom mount assemblies. The steering shaft is pivotally journaled for steering movement about a generally vertically extending steering axis defined within the swivel bracket 42. The clamping bracket 44 comprises a pair of bracket arms that are spaced apart from each other and that are affixed to the watercraft transom 38. The pivot pin 46 completes a hinge coupling between the swivel bracket 42 and the clamping bracket 44. The pivot pin 46 extends through the bracket arms so that the clamping bracket 44 supports the swivel bracket 42 for pivotal movement about a generally horizontally extending tilt axis defined by the pivot pin 46. The drive unit 34 thus can be tilted or trimmed about the pivot pin 46.

As used through this description, the terms "forward," "forwardly," "front side" and "front" with respect to the drive unit 34 mean at or to the side where the bracket assembly 36 is located, and the terms "rear," "reverse," "backward," "backwardly," "rear side" and "rearward" with respect to the drive unit mean at or to the opposite side of the front side, unless indicated otherwise or otherwise readily apparent from the context in which the terms are used.

A hydraulic tilt and trim adjustment system preferably is provided between the swivel bracket 42 and the clamping bracket 44 for tilt movement (raising or lowering) of the swivel bracket 42 and the drive unit 34 relative to the clamping bracket 44. Alternatively, the outboard motor 30 can have a manually operated system for tilting the drive unit 34.

The illustrated drive unit 34 comprises a power head 50 and a housing unit 52. The housing unit 52 includes a driveshaft housing 54 and a lower unit 56. The power head 50 is disposed on top of the drive unit 34. The power head 50 includes the engine 32 and a protective cowling assembly 60. Preferably, the protective cowling assembly 60 is made of plastic; however, other suitable materials can also be used. The protective cowling assembly 60 defines a generally closed cavity 62 in which the engine 32 is disposed. The protective cowling assembly 60 preferably comprises a top cowling member 64 and a bottom cowling member 66.

The top cowling member 64 preferably is detachably affixed to the bottom cowling member 66 by a coupling mechanism so that a user, operator, mechanic or repairperson can access the engine 32 contained within the cowling assembly 60 of the outboard motor 30 for maintenance or for other purposes. The top cowling member 64 preferably has a rear intake opening on its rear portion and its top portion and ambient air can enter the substantially enclosed cavity 62 through the intake opening. Typically, the top cowling member 64 tapers in girth toward its top surface, which is in the general proximity of the air intake opening.

The bottom cowling member 66 preferably has an opening through which an upper portion of an exhaust guide member 70 extends. The exhaust guide member 70 preferably is made of an aluminum alloy and is affixed atop the driveshaft housing 54. The bottom cowling member 66 and the exhaust guide member 70 together generally define a tray. The engine 32 is placed onto this tray and is affixed to the exhaust guide member 70. The exhaust guide member 70 also has an exhaust passage through which burnt charges (e.g., exhaust gases) from the engine 32 are discharged.

Figure 1:
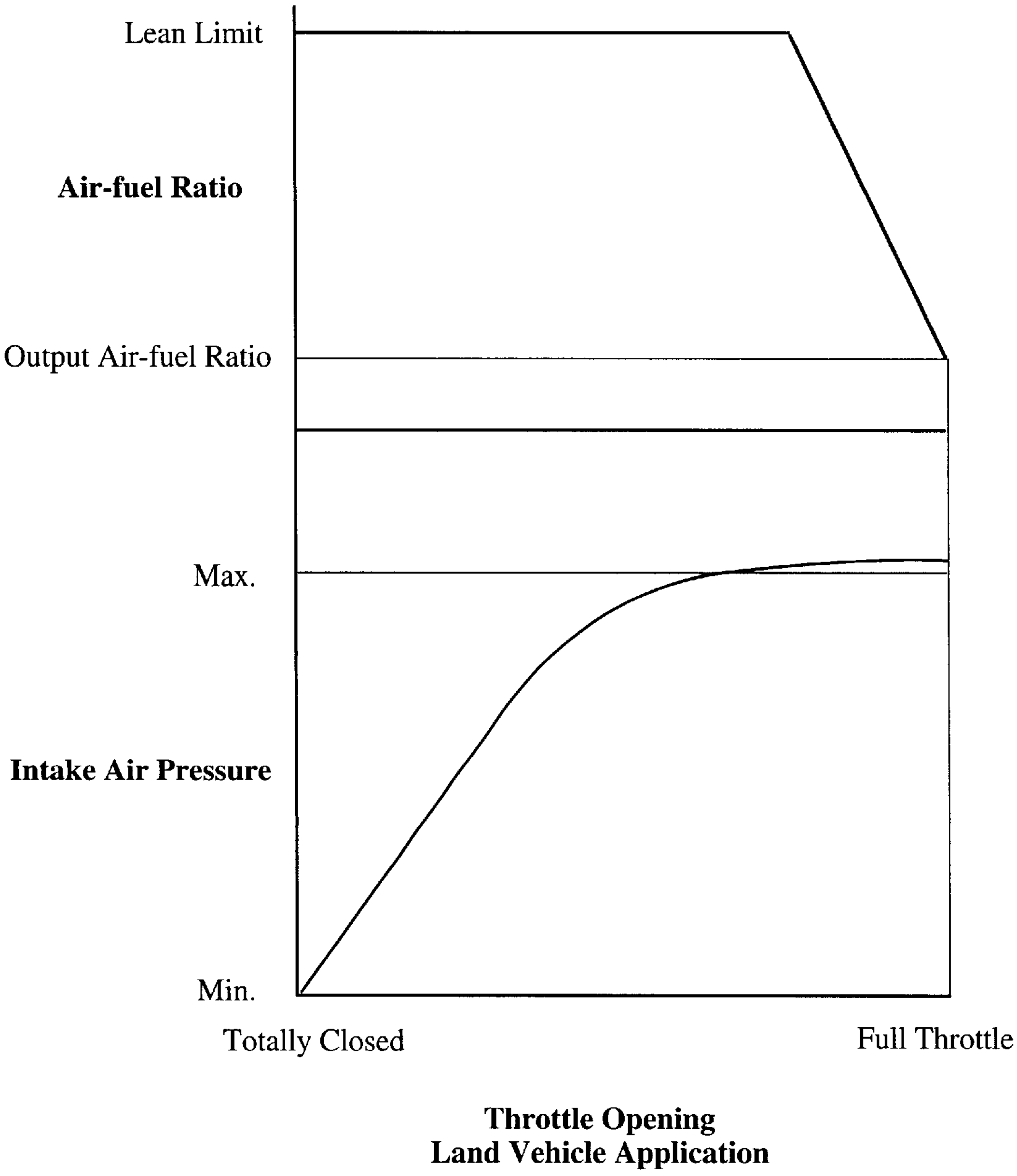
FIG. 1 is a graphical depiction of air-fuel ratio as a function of throttle position and an associated intake air pressure illustrating an implementation of a lean burn mode for an engine in a land vehicle.

The engine 32 in the illustrated embodiment of FIGS. 2 and 3 preferably operates on a four-cycle combustion principle. The engine 32 comprises a cylinder block 74. The presently preferred cylinder block 74 defines four in-line cylinder bores 76 (see FIG. 3) which preferably extend generally horizontally and which preferably are generally vertically spaced from one another. As used in this description, the term "horizontally" means that the subject portions, members or components extend generally in parallel to the water line when the associated watercraft 40 is substantially stationary with respect to the water line and when the drive unit 34 is not tilted as illustrated by the position of the drive unit 34 in FIG. 1. The term "vertically" means that portions, members or components extend generally normal to those that extend horizontally. This type of engine, however, merely exemplifies one type of engine on which various aspects and features of the present invention can be suitably used. Engines having other numbers of cylinders, having other cylinder arrangements (e.g., V, W, opposing, etc.), and operating on other combustion principles (e.g., crankcase compression two-stroke, diesel, or rotary) also can employ certain features, aspects and advantages of the present invention. Regardless of the particular construction, the engine 32 preferably comprises an engine body that includes at least one cylinder bore 76.

At least one moveable member moves relative to the cylinder block 74 in a suitable manner to effect power output from the engine 32. In the illustrated arrangement, the moveable member comprises a piston 80 that reciprocates within an associated cylinder bore 76.

A cylinder head member 82 is affixed to one end of the cylinder block 74 to close one end of each of the cylinder bores 76. In the illustrated arrangement, the cylinder head member 82, the associated pistons 80 and cylinder bores 76 define four variable-volume combustion chambers 84. A cylinder head cover member 86 covers the cylinder head member 82.

A crankcase member 88 closes the other end of the cylinder bores 76. The crankcase member 88 and the cylinder block 74 define a crankcase chamber. A crankshaft 90 extends generally vertically through the crankcase chamber and is advantageously journaled for rotation by several bearing blocks. A respective connecting rod 92 couples the crankshaft 90 with each of the pistons 80 in any suitable manner. Thus, the crankshaft 90 is caused to rotate in response to the reciprocal movement of the pistons 80.

Preferably, the crankcase member 88 is located at the most forward position of the engine 32, with the cylinder block 74 being disposed rearward of the crankcase member 88, and with the cylinder head member 82 being disposed rearward of the cylinder block 74. Generally, the cylinder block 74, the cylinder head member 82 and the crankcase member 88 together define an engine body 96. Preferably, at least these major engine portions 74, 82, 86, 88 are made of an aluminum alloy. The aluminum alloy advantageously increases strength over cast iron while decreasing the weight of the engine body 96.

The engine 32 also includes an air intake device 100 (see FIG. 3). The air intake device 100 draws air from within the cavity 62 to the combustion chambers 84. The air intake device 100 preferably comprises eight intake ports, four intake passages 102 and a single plenum chamber 104. In the illustrated arrangement, two intake ports are allotted to each combustion chamber 84, and those two intake ports communicate with a respective one of the intake passages 102.

The intake ports are defined in the cylinder head member 82. Intake valves 108 are slidably disposed at the cylinder head member 82 to move between an open position and a closed position to control the flow of air through the intake ports into the combustion chamber 84.

Biasing members, such as springs, are used to urge the intake valves 108 toward the respective closing positions. When each intake valve 108 is in the open position, the intake passage 102 that is associated with the respective intake port communicates with the associated combustion chamber 84.

Each intake passage 102 preferably is defined with an intake conduit 112. The illustrated intake conduits 112 extend forwardly alongside of and to the front of the crankcase member 88.

The plenum chamber 104 is defined with a plenum chamber member 116. The plenum chamber member 116 has an air inlet 118 that defines an air inlet passage 120 through which the air in the cavity 62 can be drawn into the plenum chamber 104. The air inlet passage 120 has an inner diameter D1 (see FIGS. 4(*a*) and 4(*b*)) selected to provide an adequate quantity of air to the combustion chambers of the engine 32 for the maximum air intake requirements of the engine 32. In some arrangements, the plenum chamber 104 acts as an intake silencer to attenuate noise generated by the flow of air into the respective combustion chambers 84. In the illustrated arrangement, the air inlet 118 forms a throttle body. Thus, the reference numeral 118 also indicates the throttle body in this description.

Figure 4A:
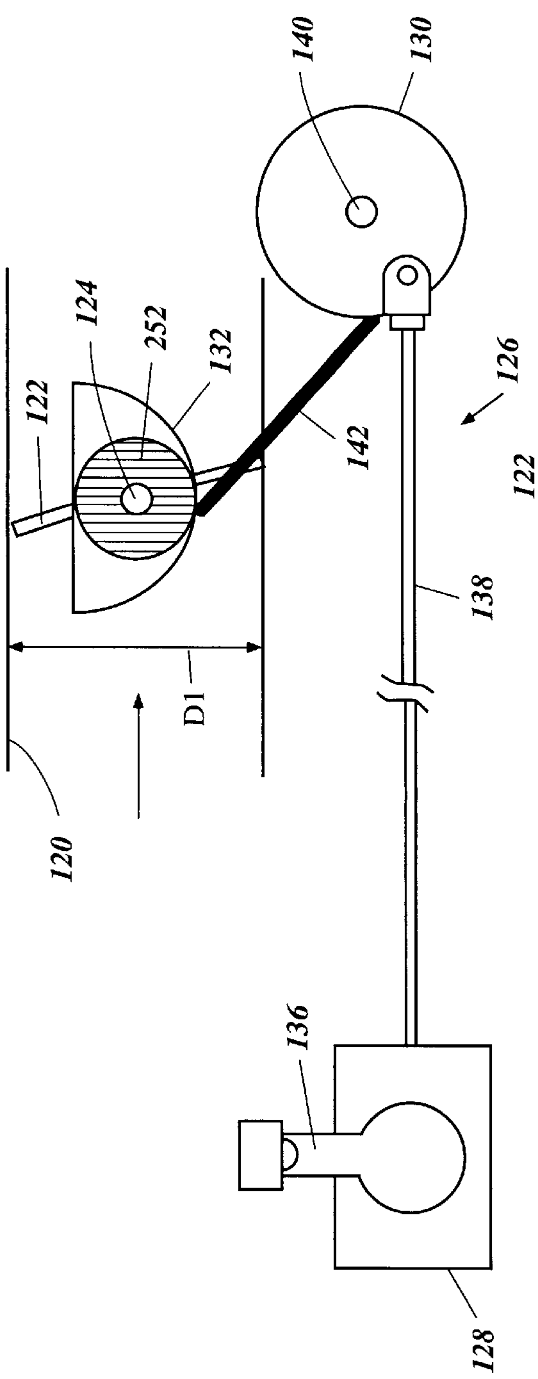
FIGS. 4(*a*) and 4(*b*) are schematic views of a throttle valve actuation mechanism using a pulley type actuator responsive to a controller, wherein FIG. 4(*a*) illustrates the throttle valve in a fully closed position and FIG. 4(*b*) illustrates the throttle valve in a fully open position.
Figure 4B:
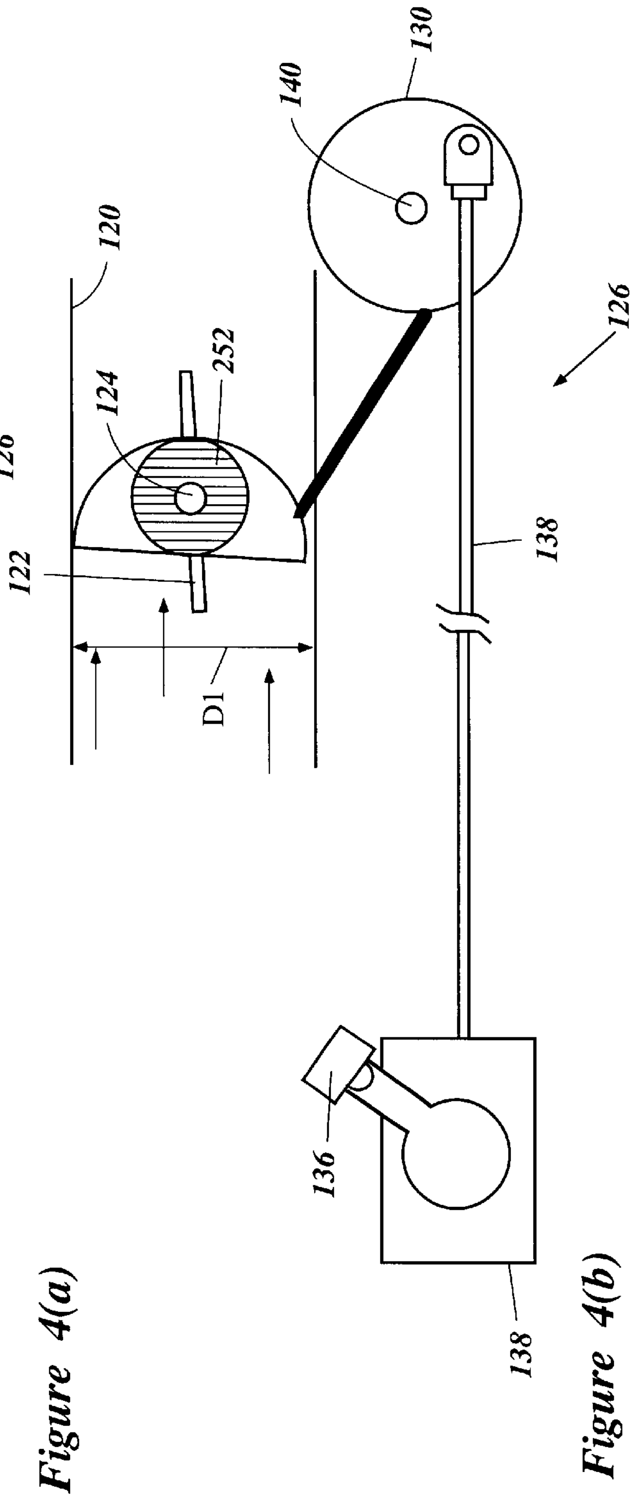

With reference to FIG. 3, FIG. 4(*a*) and FIG. 4(*b*), the illustrated throttle body 118 preferably incorporates a butterfly-type throttle valve 122 journaled for pivotal movement about an axis defined by a valve shaft 124. The throttle valve 122 is operable by the watercraft operator through a throttle valve actuation mechanism 126. The throttle valve 122 operates as an air regulator. Although described herein in connection with the throttle valve 122, it should be understood that other air regulators also could be used to implement alternative embodiments of the invention described herein.

In the arrangement illustrated in FIGS. 4(*a*) and 4(*b*), the mechanism 126 comprises a remotely disposed controller 128, a full pulley 130 and a half (e.g., semicircular) pulley 132. The controller 128 is disposed at, for example, a cockpit of the watercraft 40 and has a throttle control lever 136 journaled for pivotal movement under manual control of a watercraft operator. The control lever 136 and the full pulley 130 are connected with each other through a throttle cable 138, which generally extends horizontally in one preferred arrangement.

The full pulley 130 is journaled by a pulley shaft 140 at the throttle body 118, at the plenum chamber member 116 or at another suitable member. The full pulley 130 pivots about an axis of the pulley shaft 140.

The half pulley 132 is affixed to the throttle valve 122 and is journaled at the valve shaft 124. A connecting wire 142 has a first end affixed to the full pulley 130 and has a second end affixed to the half pulley 132 to thereby interconnect the full pulley 130 and the half pulley 132. Preferably, a bias spring (not shown) is provided to normally urge the throttle valve 122 or the half pulley 132 such that the throttle valve 122 is held at the fully closed position unless the half pulley 132 is moved via the connecting wire 142.

When the operator operates the throttle control lever 136, the full pulley 130 is moved via the throttle cable 138 and pivots about the axis of the pulley shaft 140. The pivotal movement of the full pulley 130 moves the half pulley 132 via the connecting wire 142. Accordingly, the half pulley 132 pivots about the axis of the valve shaft 124. Because the half pulley 132 is affixed to the throttle valve 122, the throttle valve 122 also pivots about the axis of the valve shaft 124. The throttle valve 122 thus is movable against the biasing force of the spring between the fully closed position shown in FIG. 4(*a*) and the fully open position shown in FIG. 4(*b*).

The full pulley 130 forms an actuator that actuates the throttle valve 132. Thus, the throttle valve 122 in this arrangement moves linearly (e.g., proportionally) relative to the movement of the actuator (i.e., the full pulley 130) and also relative to the movement of the control lever 136.

As the throttle valve 122 moves between the fully closed position and the fully open position, the throttle valve 122 regulates an amount of air flowing through the air inlet passage 120. Normally, the greater the opening degree of the throttle valve (e.g., the closer the throttle valve position is to the fully open position), the higher the rate of airflow and the higher the power output from the engine.

In some alternative arrangements, a respective throttle body 118 can be provided at each intake conduit 112. Each throttle valve in this alternative regulates airflow in each intake conduit 112.

In order to bring the engine 32 to idle speed and to maintain this speed, the throttle valve 122 generally is substantially closed; however, the valve 122 is preferably not fully closed so as to produce a more stable idle speed and to prevent sticking of the throttle valve 122 in the closed position. As used through the description, the term "idle speed" generally means a low engine speed that is achieved when the throttle valve 122 is closed but also includes a state such that the valve 122 is slightly more open to allow a minute amount of air to flow through the intake passages 102.

As shown in FIG. 3, the air intake device 100 preferably includes an auxiliary air device (AAD) 144 that bypasses the throttle valve 122 with a bypass passage 146. Idle air can be delivered to the combustion chambers 84 through the AAD 144 when the throttle valve 122 is placed in a substantially closed or fully closed position.

The AAD 144 preferably comprises an auxiliary valve that controls airflow through the bypass passage 146 such that the amount of the air flow can be fine-tuned. Preferably, the auxiliary valve is a needle valve that can move between an open position and a closed position to selectively close the bypass passage 146. The illustrated AAD 144 is affixed to the air inlet or throttle body 118. The throttle body 118 and the AAD 144 together form a throttle device 148 in this arrangement.

The AAD 144, in particular, the auxiliary valve, is controlled by an electronic control unit (ECU) 150 through a control line 151. The ECU 150 preferably is mounted on the engine body 96 at an appropriate location. The ECU 150 forms a control device that is a primary part of the control system 33 and will be described in greater detail below.

The engine 32 also comprises an exhaust device that guides burnt charges, e.g., exhaust gases, to a location outside of the outboard motor 30. Each cylinder bore 76 preferably has two exhaust ports (not shown) defined in the cylinder head member 82. The exhaust ports can be selectively opened and closed by exhaust valves 152. The construction of each exhaust valve 152 and the arrangement of the exhaust valves 152 are substantially the same as construction of the intake valves 108 and the arrangement thereof, respectively.

An exhaust passage 154 preferably is disposed proximate to the combustion chambers and extends generally vertically. For example, an exhaust manifold 156 defines the exhaust passage 154 in the illustrated embodiment. The exhaust passage 154 communicates with the combustion chambers 84 through the exhaust ports to collect exhaust gases therefrom. The exhaust manifold 156 couples the foregoing exhaust passage 154 with the exhaust guide member 70. When the exhaust ports are opened, the exhaust gases from the combustion chambers 84 pass through the exhaust passage 154 to the exhaust passage of the exhaust guide member 70.

Preferably, a valve cam mechanism is provided to actuate the intake valves 108 and the exhaust valves 152. In the illustrated arrangement, the valve cam mechanism includes an intake camshaft 160 and an exhaust camshaft 162 both extending generally vertically and both journaled for rotation relative to the cylinder head member 82. In the illustrated arrangement, bearing caps journal the camshafts 160, 162 with the cylinder head member 82. The cylinder head cover member 86 preferably defines a camshaft chamber together with the cylinder head member 82.

Each camshaft 160, 162 has cam lobes 164 to push valve lifters that are affixed to the respective ends of the intake and exhaust valves 108, 152. The cam lobes 164 repeatedly push the valve lifters in a timed manner proportional to the engine speed, e.g., the speed of rotation of the crankshaft 90. The movement of the lifters generally is timed by the rotation of the camshafts 160, 162 to appropriately actuate the intake and exhaust valves 108, 152.

A camshaft drive mechanism drives the valve cam mechanism. The intake camshaft 160 and the exhaust camshaft 162 respectively preferably comprise a driven intake sprocket positioned atop the intake camshaft 160 and a driven exhaust sprocket positioned atop the exhaust camshaft 162. The crankshaft 90 in turn preferably has a drive sprocket positioned at an upper portion thereof. Of course, other locations of the sprockets also are applicable.

A timing chain or belt is wound around the driven sprockets and the drive sprocket. Thus, when the crankshaft 90 turns and rotates the drive sprocket, the timing chain or belt causes the driven sprockets to rotate and therefore rotate the camshafts 160, 162 in a timed relationship. Because the camshafts 160, 162 must rotate at half of the speed of the rotation of the crankshaft 90 in the four-cycle combustion principle, a diameter of each of the driven sprockets is twice as large as a diameter of the drive sprocket. Other suitable drive mechanisms (e.g., direct gear train) also can be used.

As further shown in FIG. 3, the engine 32 preferably has a port or manifold fuel injection system. The fuel injection system preferably comprises at least four fuel injectors 168 in which one fuel injector 168 is allotted for each of the respective combustion chambers 84 through suitable fuel conduits, such as fuel rails. The fuel injectors 168 preferably are mounted on the fuel rail, which is mounted on the cylinder head member 82. Each fuel injector 168 preferably has an injection nozzle directed toward the associated intake passage adjacent to the intake ports. The ECU 150 controls the fuel injectors 168 through a control line 170.

With continued reference to the schematic illustration of FIG. 3, in addition to the fuel injectors 168 and the fuel rail, the illustrated fuel injection system comprises a fuel storage tank 172, a fuel filter 174, a low-pressure fuel pump 176, a vapor separator tank 178, a high-pressure fuel pump 180 and a pressure regulator 182.

The fuel storage tank 172 preferably is located in the hull of the associated watercraft 40 to store fuel that is supplied to the fuel injectors 168. A vapor separator tank 180 preferably is disposed on a sidewall of the engine body. Fuel in the storage tank 172 is delivered to the vapor separator tank 180 by the low-pressure pump 76 through a fuel supply passage 184, which includes the fuel filter 174. The vapor separator tank 180 removes vapor from the fuel prior to pressurization by the high-pressure fuel pump 180. The illustrated high-pressure fuel pump 180 is submerged in the fuel within the vapor separator 180 and pumps the fuel toward the fuel injectors 168 through fuel delivery passages 186, 188.

The pressure regulator 182 is connected to the fuel delivery passages 186, 188 via a return passage 190 and is also connected with the vapor separator tank 180 via another return passage 192. The pressure regulator 182 is also connected to the plenum chamber 104 via an air passage 194. Air in the plenum chamber 104, however, does not flow through the air passage 194. Rather, the intake pressure in the plenum chamber 104 is transmitted to the regulator 182 through the air passage 194 such that the pressure regulator 182 is responsive to the intake pressure.

The fuel injectors 168 spray fuel into the intake passages 102 under control of the ECU 150. The illustrated ECU 150 controls both the initiation timing and the duration of every injection so that the nozzles spray a proper amount of the fuel at a correct time during each combustion cycle. The pressure regulator 182 regulates the fuel pressure by returning a surplus amount of the fuel to the vapor separator 178 through the return passages 190, 192. The pressure regulator 182 advantageously regulates the pressure to a substantially constant magnitude. Thus, the proper amount of the injected fuel is controlled by the duration of the injection. In other words, since the pressure is substantially constant, the injected fuel amount varies in proportion to the duration of the injection.

Alternatively, the fuel injectors 168 can be disposed for direct cylinder injection. In this alternative, the fuel injectors 168 directly spray the fuel into the combustion chambers 84 rather than into the intake passages 102.

In general, the fuel amount is determined basically such that the air-fuel ratio of the charge in the combustion chambers 84 is equal to the stoichiometric air-fuel ratio. Theoretically, the stoichiometric air-fuel ratio is the most ideal air-fuel ratio because, at the stoichiometric air-fuel ratio, the fuel charge can be completely burned. When gasoline is used as the fuel, the stoichiometric air-fuel ratio is approximately 14.7. To a certain extent, the engine 32 can operate at an air-fuel ratio other than the stoichiometric air-fuel ratio. For example, in some circumstances, a leaner air-fuel ratio provides a greater fuel economy, as will be discussed.

With continued reference to FIG. 3, the engine, 32 further comprises an ignition or firing system. Each combustion chamber 84 is provided with a spark plug 196 that is connected to the ECU 150 via an ignition device 198 and a control line 200 so that the ECU 150 also can control ignition timing. Each spark plug 196 has electrodes that are exposed in the associated combustion chamber 84 and are spaced apart from each other with a small gap. The illustrated ignition device 198 comprises power transistors 202 and ignition coils 204 which are connected in series with each other. Each spark plug 196 is responsive to the ignition device 198 to generate a spark between the electrodes to ignite an air-fuel charge in the respective combustion chamber 84 at selected ignition timing under control of the ECU 150.

In the illustrated engine 32, the pistons 80 reciprocate between top dead center and bottom dead center. When the crankshaft 90 makes two rotations, the pistons 80 generally move from top dead center to bottom dead center (the intake stroke), from bottom dead center to top dead center (the compression stroke), from top dead center to bottom dead center (the power stroke) and from bottom dead center to top dead center (the exhaust stroke). During the four strokes of the pistons 80, the camshafts 160, 162 make one rotation and actuate the intake valves 108 and the exhaust valves 152 to open the intake ports during the intake stroke and to open the exhaust ports during the exhaust stroke, respectively.

Generally, during the intake stroke, air is drawn into the combustion chambers 84 through the air intake passages 102 and fuel is injected into the intake passages 102 by the fuel injectors 168. The air and the fuel thus are mixed to form the air-fuel charge in the combustion chambers 84. Slightly before or during the power stroke, the respective spark plug 196 ignites the compressed air-fuel charge in the respective combustion chamber 84. The air-fuel charge thus rapidly burns during the power stroke to move the piston 80. The burnt charge (e.g., exhaust gases) is then discharged from the combustion chamber 84 during the exhaust stroke.

During engine operation, heat is generated in the combustion chambers 84, and the temperature of the engine body 96 increases. The illustrated engine 32 thus includes a cooling system to cool the engine body 96. The outboard motor 30 preferably employs an open-loop type water-cooling system that introduces cooling water from the body of water surrounding the motor 30 and then discharges the water back into the same body of water. The cooling system includes one or more water jackets 208 (shown schematically in FIG. 3 adjacent to cam shaft 160) defined within the engine body 96 through which the introduced water travels around to remove heat from the engine body 96.

The engine 32 also preferably includes a lubrication system. A closed-loop type system preferably is employed in the illustrated embodiment. The lubrication system comprises a lubricant tank 210 (see FIG. 2) that defines a reservoir cavity, which preferably is positioned within the driveshaft housing 54. An oil pump (not shown) is located, for example, on top of the driveshaft housing 54. The oil pump pressurizes the lubricant oil in the reservoir cavity. The lubricant oil is conveyed to certain engine portions via lubricant delivery passages to provide lubrication to various moving parts of the engine. Lubricant return passages return the oil to the lubricant tank for re-circulation.

A flywheel assembly (not shown) preferably is positioned at the upper portion of the crankshaft 90 and is mounted onto one end of the crankshaft 90 so as to rotate the flywheel as the crankshaft 90 rotates. The flywheel assembly includes a flywheel magneto or AC generator that supplies electric power to various electrical components such as the fuel injection system, the ignition system and the ECU 150.

As further shown in FIG. 2, the driveshaft housing 54 depends from the power head 50 to support a driveshaft 214 which is coupled with the crankshaft 90 and which extends generally vertically through the driveshaft housing 54. The driveshaft 214 is journaled for rotation and is driven by the crankshaft 90. The driveshaft housing 54 preferably defines an internal section of the exhaust system that conveys most of the exhaust gases to the lower unit 56. An idle discharge section branches from the internal section to discharge idle exhaust gases directly to the atmosphere through a discharge port that is formed on a rear surface of the driveshaft housing 54; such a discharge occurs during idle of the engine 32. The driveshaft 214 preferably drives the oil pump.

As further shown in FIG. 2, the lower unit 56 depends from the driveshaft housing 54 and supports a propulsion shaft 216 that is driven by the driveshaft 214. The propulsion shaft 216 extends generally horizontally through the lower unit 56 and is journaled for rotation. The propulsion device 41 is attached to the propulsion shaft 216. In the illustrated arrangement, the propulsion device 41 includes a propeller 218 that is affixed to an outer end of the propulsion shaft 216. The propulsion device, however, can be a dual counter-rotating system, a hydrodynamic jet, or any other suitable propulsion device.

As shown in FIG. 2, the driveshaft 214 and the propulsion shaft 216 are preferably oriented normal to each other (e.g., the rotation axis of propulsion shaft 216 is at 90° to the rotation axis of the drive shaft 214). A transmission 222 preferably is provided between the driveshaft 214 and the propulsion shaft 216 to couple the two shafts 214, 216 by bevel gears, for example. The transmission 222 incorporates a changeover unit (e.g., a shifting device) 224 that changes the operational mode of the propeller 218 via a shift mechanism in the transmission 222. The operational modes of the propeller 218 include a first mode (e.g., a forward mode), a second mode (e.g., a neutral mode) and a third mode (e.g., a reverse mode). In the first operational mode, the propeller 218 is rotated in a first rotational direction to impart a forward motion to the watercraft 40. In the second operational mode the propeller 218 does not rotate and does not impart motion to the watercraft 40. In the third operational mode, the propeller is rotated in a second rotational direction opposite the first rotational direction to impart a rearward motion to the watercraft 40.

The watercraft operator preferably operates the changeover unit 224 with a shift control lever (not shown) of the controller 128 (FIGS. 4(*a*) and 4(*b*)). The movements of the shift control lever of the controller 128 are communicated to the changeover unit 224 via a shift cable 230, a slider 232 and a shift control shaft 234. The shift control lever is disposed proximate to the throttle control lever 136 and is pivoted with respect to the body of the controller 128 for pivotal movement. In one arrangement, the shift cable 230 generally extends horizontally from the controller 128 in the cockpit of the watercraft 40 to the marine drive 30 and is preferably located proximate the throttle cable 138. The slider 232 connects the shift cable 230 and the shift control shaft 234. The shift control shaft 234 extends generally vertically through the steering shaft and a front portion of the housing unit 52. When the operator operates the shift control lever, the pivotal movement of the shift control lever is communicated as longitudinal movement of the shift cable 230 and the slider 232. The longitudinal movement of the slider 232 causes rotational movement of the shift control shaft 234 that is communicated to the changeover unit 224 to cause the changeover unit 234 to change the rotational direction of the propeller 218.

The lower unit 56 also defines an internal section of the exhaust system that is connected with the internal section of the driveshaft housing 54. At engine speeds above idle, the exhaust gases generally are discharged to the body of water surrounding the outboard motor 30 via the internal sections and then via a discharge section defined within the hub of the propeller 218.

The illustrated ECU 150 is coupled to sensors that sense operational conditions of the engine 32, operational conditions of the outboard motor 30, or operational conditions of both the engine 32 and the outboard motor 30. In preferred embodiments of the system described herein, the ECU 150 receives sensed information (e.g., parameters representing operating conditions) from at least an intake pressure sensor 250 via a sensor line 262, a throttle valve position sensor 252 via a sensor line 264, a camshaft angle position sensor 254 via a sensor line 266, an intake temperature sensor 256 via a sensor line 268, a water temperature sensor 258 via a sensor line 270 and an oxygen ($O_2$) sensor 260 via a sensor line 272. It should be mentioned that any or all of the sensors can communicate with the ECU 150 in any suitable manner, including wireless applications.

The intake pressure sensor 250 preferably is located on the plenum chamber member 116 so that a sensor tip thereof is positioned within the plenum chamber 104 to sense an intake pressure therein. The intake pressure sensor 250 sends an intake pressure signal to the ECU 150 via the signal line 262. Because the plenum chamber 104 is connected to the respective intake passages 102, the signal of the intake pressure sensor 250 advantageously represents a condition of the intake pressure of each intake passage 250 that is in the intake stroke. Alternatively, the intake pressure sensor 250 can be located in one or more of the intake passages 102.

The throttle position sensor 252 preferably is located proximate the valve shaft 124 of the throttle valve 122 to sense an angular position between the open angular position and the closed angular position of the throttle valve 122. The throttle position sensor 252 sends a throttle valve position signal (e.g., an opening degree signal) to the ECU 150 via the signal line 264.

By sensing the throttle opening degree, the throttle valve position sensor 252 senses the operator's demand or engine load. Generally, the intake pressure also varies in proportion to the change of the throttle opening degree (see FIG. 5) and the intake pressure sensor 250 senses the intake pressure. For example, when the throttle valve 122 opens in response to the operation of the throttle control lever 136 by the operator to increase the speed of the watercraft 40, the intake pressure downstream of the throttle valve increases. As another example, the engine load may increase when the watercraft 40 advances against wind and the operator operates the throttle control lever 136 (FIGS. 4(*a*) and 4(*b*)) to maintain a desired speed of the watercraft 40.

The camshaft angle position sensor 254 preferably is positioned on or proximate to the exhaust camshaft 162 to sense an angular position of the exhaust camshaft 162. Alternatively, the sensor 254 can be positioned on or proximate to the intake camshaft 160 because the two camshafts 160, 162 are mutually synchronized. In this description, the illustrated exhaust camshaft 162 (or, alternatively, the intake camshaft 160) is referred to as a second movable member. The camshaft angle position sensor 254 sends a signal to the ECU 150 via the signal line 266. As described above, the exhaust camshaft 162 and the intake camshaft 160 are driven by the crankshaft 90 through the camshaft drive mechanism. The signal of the camshaft angle position sensor 254 thus can be used by the ECU 150 to calculate an engine speed.

The ECU 150 includes an engine speed calculating unit 276, which is part of a control program. The unit 276 calculates the engine speed by evaluating the changes in the signal from the camshaft angle position sensor 254 as a function of time (e.g., a rotation rate of the camshaft). The engine speed calculating unit 276 thus forms an engine speed sensor in this description. In certain alternative arrangements, a signal from a crankshaft angle position sensor, which detects an angular position of the crankshaft 90, can advantageously be used for calculating the engine speed.

The intake temperature sensor 256 preferably is located on the plenum chamber member 116 so that a sensor tip thereof is positioned within the plenum chamber 104 to sense a temperature of the intake air in the plenum chamber 104. The intake temperature sensor 256 sends an intake temperature signal to the ECU 150 via the signal line 268.

The water temperature sensor 258 preferably is located at the cylinder head member 82 so that a sensor tip thereof is positioned within the water jacket to sense a temperature of the cooling water. Other suitable sensor arrangements also can be used. The water temperature sensor 258 sends a water temperature signal to the ECU 150 via the signal line 270. Generally, the signal from the water temperature sensor 258 represents a temperature of the engine body 96.

The oxygen sensor 260 preferably is located on the exhaust conduit 156 so that a sensor tip thereof is positioned within the exhaust passage 154 to sense an amount of the oxygen ($O_2$) remaining in the exhaust gases. The oxygen sensor 260 sends a signal indicative of the amount of the residual oxygen to the ECU 150 via the signal line 272. The ECU 150 uses the signal from the oxygen sensor 260 to determine an air-fuel ratio. Thus, the oxygen sensor 260 advantageously functions as an air-fuel ratio sensor.

The signal lines preferably are configured with hard wires (e.g., insulated copper wires), which may be bundled in a wiring harness or the like. Alternatively, the signals can be sent through optical emitter and detector pairs, infrared radiation, radio waves or the like. The type of signal and the type of interconnection can be the same for all the sensor signals, or the type of signal and the type of interconnection can be different for some of the sensors. The control lines described herein can also use different types of signals and interconnections.

In the alternative embodiments of the control system 33, sensors other than the sensors described above can also advantageously be provided to sense the operational condition of the engine 32, the outboard motor 30 or both. For example, an oil pressure sensor and a knock sensor can also be included to provide additional condition information to the ECU 150.

The ECU 150 preferably is configured as a feedback control device that uses the signals of the sensors for feedback control of the engine 32. Preferably, the ECU 150 comprises a central processing unit (CPU) and at least one storage unit. The storage unit holds various control maps. For example, the control maps include data regarding parameters that are used by the ECU 150 to determine optimum or target control conditions. The ECU 150 controls at least the fuel injectors 168, the ignition device 198 and the AAD 144 in accordance with the target control conditions and monitors actual operating conditions using the signals from the sensors to determine whether the actual conditions differ from the target control conditions. The ECU 150 is responsive to the sensed actual conditions to generate and send control signals to the fuel injectors 168, to the ignition device 198 and to the AAD 144 to cause the actual control conditions to vary toward the target control conditions if the ECU 150 determines that one or more of the actual conditions differ from the corresponding target control conditions.

Figure 5:
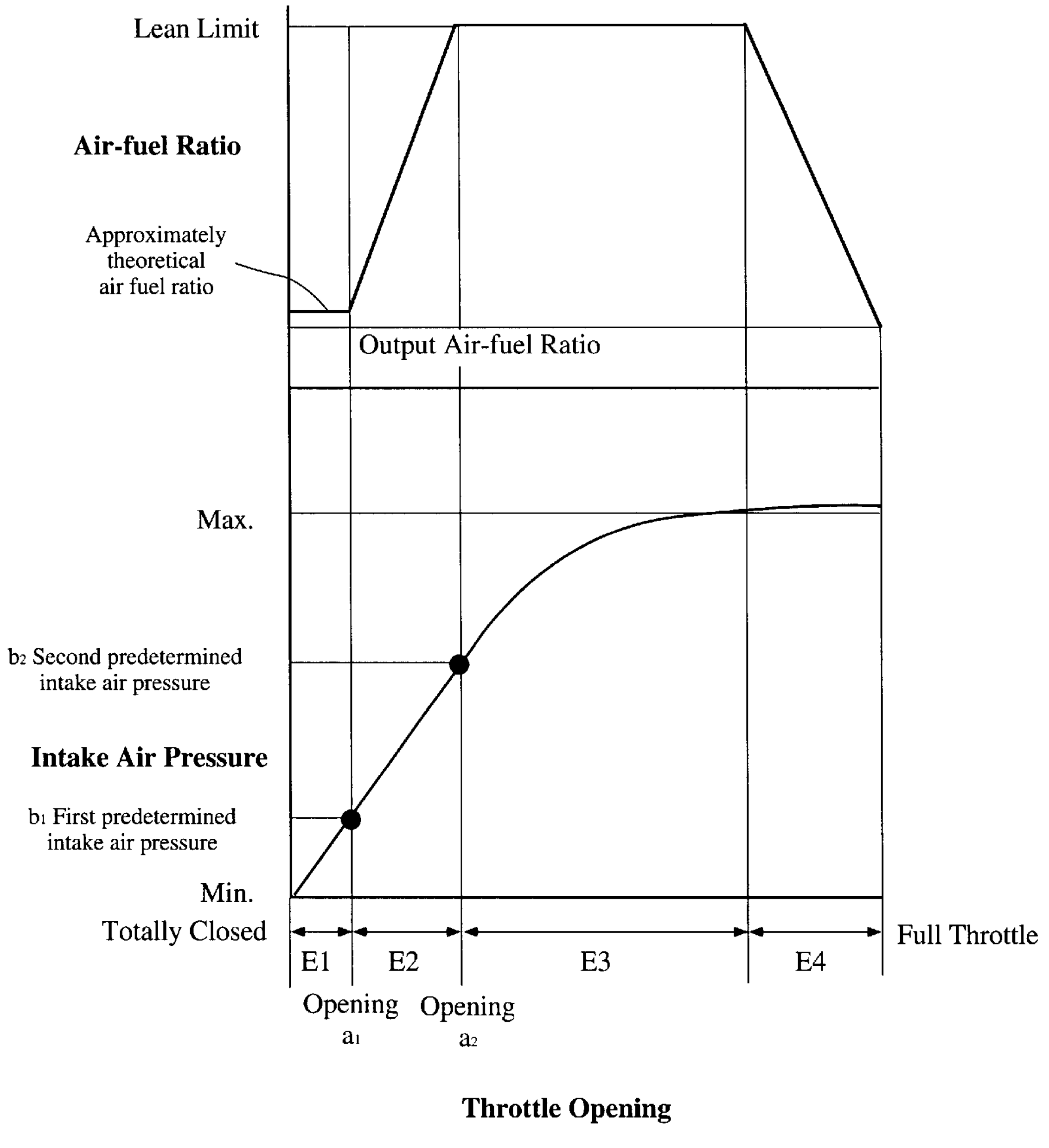
FIG. 5 is a graphical depiction of air-fuel ratio as a function of throttle position and an associated intake air pressure, which depiction illustrates an implementation of a lean burn mode for a marine engine.

With reference now to FIG. 5, the present engine 32, while not being designed for dedicated full-time lean burn operation, is designed to operate in both a lean burn mode and a richer, sometimes generally stoichiometric, air-fuel ratio mode through an inventive control strategy. The ECU 150 controls the fuel injectors in the manners set forth above such that the air-fuel mixture varies from a preset air-fuel ratio to a leaner air-fuel ratio and back to the preset air-fuel ratio depending upon throttle opening or operator demand. In one arrangement, the preset air-fuel ratio is stoichiometric.

With continued reference to FIG. 5, when the throttle valve 122 is initially opened from the closed position, the fuel injection system supplies an amount of fuel to supply a preset air-fuel mixture to the combustion chambers. In one embodiment, the preset air-fuel ratio is generally stoichiometric. This preset goal is maintained until a first predetermined pressure b1 is established within the induction system downstream of the throttle valve 122 (e.g., within the plenum chamber member 116).

In the illustrated arrangement, the throttle position al (see FIG. 5) corresponds to the first predetermined pressure b1. In other words, with the throttle valve 122 placed in a set position a1, the air pressure within the induction system at a location between the throttle valve 122 and the combustion chamber 84 approaches the first predetermined pressure b1. Thus, when the watercraft operator places the throttle valve 122 in a position known to correspond to a low load engine operating range (e.g., between a totally closed state of the throttle valve 122 and throttle position a1), the ECU 150 maintains a fairly constant preset air-fuel ratio. As mentioned above, this preset air-fuel ratio can be generally stoichiometric in one application. To maintain the preset air-fuel ratio, fuel injection preferably is controlled based upon engine speed and intake air pressure.

The region of throttle opening between starting of the engine and the first predetermined throttle position has been identified as E1 on FIG. 5. In one arrangement, this region of throttle opening can be determined based upon throttle valve positioning during idling and trawling operation of the engine. In this way, the engine 32 maintains a rather steady idle operation and engine efficiency is not detrimentally affected.

As the throttle valve 122 is opened beyond the first predetermined opening a1, the ECU 150 controls the amount of fuel injected into the combustion chamber 84 based at least in part upon the sensed intake air pressure. In one arrangement, the amount of fuel is leaned toward a lean limit ratio as the air pressure increases and the engine speed increases. Of course, the engine speed will vary with the throttle angle such that further opening of the throttle valve causes the engine speed to increase. Additionally, as the throttle valve is opened further, the sensed air pressure at a location between the throttle valve 122 and the combustion chamber 84 will tend to increase.

At a preset opening angle a2, however, the sensed air pressure will surpass a second predetermined intake air pressure b2. Between the predetermined intake air pressures b1 and b2, which correspond to the preset throttle valve angles a1 and a2, the air-fuel ratio is progressively leaned toward a lean limit. With reference to FIG. 5, this range of progressive leaning occurs in the region identified by E2. The fuel injection, again, can be controlled based upon engine speed and intake air pressure to provide feedback controlled engine operation.

Once the second predetermined intake air pressure b2 is exceeded, the ECU 150 maintains the lean limit air-fuel ratio during an expansive throttle operating range E3. While the throttle valve 122 continues to open, the air pressure will continue to build until a maximum air pressure (Max.) has been attained. During this building of air pressure, the engine 32 is operated in a lean burn mode and fuel efficiency is improved over this range of engine operation. Thus, the fuel consumption of the engine 32 is reduced. Once again, fuel injection preferably is controlled based upon engine speed and air intake pressure to maintain a proper feedback controlled engine operation.

Once the intake air pressure has reached an approximate maximum or high level, the air-fuel ratio is gradually richened to improve responsiveness of the engine 32. In other words, in the range E4 of FIG. 5, the intake air pressure is approximately constant and thus the intake air pressure parameter is less advantageous for monitoring and controlling operation of the engine 32. In this range, the ECU 150 controls the fuel injection quantities in accordance with the engine speed and the sensed throttle position. When the intake air volume reaches near the maximum in range E4, the ECU 150 gradually reduces the air-fuel ratio to run the engine 32 at full load in a fuel rich condition. By decreasing the air-fuel ratio from the lean limit, the engine speed can be further increased over the engine speed attainable during lean limit operation at full intake air pressure.

In this manner, the engine does not operate in a lean burning mode in the very low load range (El) or in the high load range (E4). For example, in the very low load range, the ECU 150 maintains the amount of fuel injected into the combustion chamber 84 at the preset constant air-fuel ratio. From the first predetermined intake air pressure b1 to the second predetermined intake air pressure b2, the fuel injection quantities are controlled such that the air-fuel ratio is gradually varied between the constant air-fuel ratio in the range E1 and the lean limit in the range E3. The value of the second predetermined intake air pressure b2 is below the maximum intake air pressure. The intake air pressure becomes approximately constant beyond the maximum intake air pressure.

Advantageously, the ECU 150 controls the fuel injection quantities without having to modifying the existing cylinder head 82 and inlet port of the engine 32 to operate in a lean burn mode. Lean burn operation is achieved in a middle load or above, which reduces fuel consumption. The engine 32 does not operate at the lean limit of the lean burn mode when high torque (full load) or a stable idle or lower speed operation is desired. In these ranges, the engine 32 operates at lower (richer) air-fuel ratios. As shown in FIG. 5, these lower air-fuel ratios range from the lean limit down to the preset air-fuel ratio, which can be the approximate theoretical air fuel ratio in one arrangement. At these lower air-fuel ratios, the engine 32 achieves high torque and stability during idling and trawling.

Although the present invention has been described in terms of a certain preferred embodiment, other embodiments apparent to those of ordinary skill in the art also are within the scope of this invention. Thus, various changes and modifications may be made without departing from the spirit and scope of the invention. Moreover, not all of the features, aspects and advantages are necessarily required to practice the present invention. Accordingly, the scope of the present invention is intended to be defined only by the claims that follow.

What is claimed is:

1. An outboard motor for a watercraft comprising:

an engine body defining at least one cylinder bore in which a piston reciprocates;

a cylinder head affixed to one end of said engine body for closing said cylinder bore and defining with said piston and said cylinder bore a combustion chamber;

an intake passage in fluid communication with said combustion chamber and configured to provide air for an air/fuel mixture to said combustion chamber;

a throttle body in fluid communication with said intake passage and having a throttle plate configured to control an air flow in said intake passageway;

a throttle position sensor configured to determine a position of said throttle plate;

an intake air pressure sensor in fluid communication with said intake passage, being positioned between said throttle valve and said combustion chamber and being configured to determine air pressure in said intake passage;

a fuel injector configured to deliver fuel to said combustion chamber for said air/fuel mixture;

an engine speed detector configured to determine an engine speed; and an engine control unit configured to control said fuel injector based upon feedback from at least one of said throttle position sensor, said engine speed detector, and said intake air pressure sensor, wherein between a closed state of said throttle plate and a first predetermined air pressure, a constant air/fuel ratio is maintained, from said first predetermined air pressure to a second predetermined air pressure, said air/fuel ratio is steadily increased as a function of a change in air pressure to approximately a lean limit ratio, said second predetermined air pressure being less than a maximum intake air pressure, said maximum intake air pressure occurring when said air pressure in said intake passage becomes approximately constant, from said second predetermined intake air pressure to said maximum intake air pressure, said air/fuel ratio is maintained at approximately said lean limit ratio, and from said maximum intake air pressure to a maximum throttle opening, said air/fuel ratio is decreased in accordance with feedback from said throttle position sensor and said engine speed detector.

2. An outboard motor for a watercraft as set forth in claim 1, wherein said constant air/fuel ratio is approximately a stoichiometric air/fuel ratio.

3. An outboard motor for a watercraft as set forth in claim 1, wherein said constant air/fuel ratio is used when said outboard motor is operating at low speed.

4. An outboard motor for a watercraft as set forth in claim 1, wherein said constant air/fuel ratio is used when said outboard motor is operating at low load.

5. An outboard motor for a watercraft as set forth in claim 1, wherein said lean limit ratio is greater than said stoichiometric air/fuel ratio.

6. An outboard motor for a watercraft as set forth in claim 1, wherein said lean limit ratio is used when said outboard motor is operating at midrange speed.

7. An outboard motor for a watercraft as set forth in claim 1, wherein said lean limit ratio is used when said outboard motor is operating at midrange load.

8. An outboard motor for a watercraft as set forth in claim 1, wherein said air/fuel ratio is decreased toward said constant air/fuel ratio when said outboard motor is operating at said maximum throttle angle.

9. An outboard motor for a watercraft as set forth in claim 1, wherein said air/fuel ratio is decreased toward said constant air/fuel ratio when said outboard motor is operating at high speed.

10. An outboard motor for a watercraft as set forth in claim 1, wherein said air/fuel ratio is decreased toward said constant air/fuel ratio when said outboard motor is operating at high load.

11. An outboard motor for a watercraft as set forth in claim 1, wherein between said closed state of said throttle plate and said first predetermined air pressure, said engine control unit maintains said constant air/fuel ratio in accordance with output from said engine speed detector and said intake air pressure sensor.

12. An outboard motor for a watercraft as set forth in claim 1, wherein from said first predetermined air pressure to said second predetermined air pressure, said air/fuel ratio is varied in accordance with output from said engine speed detector and said intake air pressure sensor.

13. An outboard motor for a watercraft as set forth in claim 1, wherein from said maximum intake air pressure to said maximum throttle angle, said air/fuel ratio is varied independent of said air pressure in said intake passage.

14. An outboard motor for a watercraft as set forth in claim 1, wherein from said maximum intake air pressure to said maximum throttle angle, said air/fuel ratio is varied in accordance with output from said engine speed detector and said throttle angle sensor.

15. A method of operating an outboard motor, said outboard motor comprising an engine driving a marine propulsion device at speeds indicated by an engine speed sensor, said method comprising detecting an induction system air pressure at a location between a throttle valve and a combustion chamber, supplying a preset constant air/fuel ratio to said combustion chamber at sensed air pressures lower than a first predetermined air pressure, supplying a variable air/fuel ratio at sensed air pressures between said first predetermined air pressure and a second predetermined air pressure, supplying a lean limit air/fuel ratio at sensed air pressures between said second predetermined air pressure and a maximum air pressure and supplying a variable air/fuel ratio at throttle angles greater than a minimum throttle angle corresponding to said maximum air pressure.

16. The method of claim 15, wherein said air/fuel ratio varies with throttle angle when said throttle angle exceeds said minimum throttle angle.

17. The method of claim 16, wherein said air/fuel ratio also varies with engine speed.

18. The method claim 15, wherein said air/fuel ratio varies with sensed air pressure when said sensed air pressure is between said first predetermined air pressure and said second predetermined air pressure.

19. The method of claim 18, wherein said air/fuel ratio also varies with engine speed.

20. The method of claim 15, wherein said constant air/fuel ratio is approximately a stoichiometric air/fuel ratio.

* * * * *